US012729987B2

(12) United States Patent
Sun et al.

(10) Patent No.: US 12,729,987 B2
(45) Date of Patent: Sep. 8, 2026

(54) MASSIVE SUBMARINE MONITORING BOTDA SYSTEM BASED ON MESH MULTI-STAGE REMOTE PUMP AMPLIFICATION

(71) Applicants: NANJING XIGUANG RESEARCH INSTITUTE FOR INFORMATION TECHNOLOGY CO., LTD, Jiangsu (CN); JIANGSU SHENYUAN MARINE INFORMATION TECHNOLOGY AND EQUIPMENT INNOVATION CENTER CO., LTD., Jiangsu (CN)

(72) Inventors: Xiaohan Sun, Jiangsu (CN); Tao Lyu, Jiangsu (CN); Xiongqiang Tao, Jiangsu (CN); Jien Song, Jiangsu (CN); Yongke Zhao, Jiangsu (CN)

(73) Assignees: NANJING XIGUANG RESEARCH INSTITUTE FOR INFORMATION TECHNOLOGY CO., LTD, Jiangsu (CN); JIANGSU SHENYUAN MARINE INFORMATION TECHNOLOGY AND EQUIPMENT INNOVATION CENTER CO., LTD., Jiangsu (CN)

( * ) Notice: Subject to any disclaimer, the term of this patent is extended or adjusted under 35 U.S.C. 154(b) by 130 days.

(21) Appl. No.: 18/856,063

(22) PCT Filed: Sep. 20, 2023

(86) PCT No.: PCT/CN2023/119999

§ 371 (c)(1),
(2) Date: Oct. 11, 2024

(87) PCT Pub. No.: WO2025/039318

PCT Pub. Date: Feb. 27, 2025

(65) Prior Publication Data

US 2026/0185855 A1 Jul. 2, 2026

(30) Foreign Application Priority Data

Aug. 22, 2023 (CN) ........................ 202311059812.9

(51) Int. Cl.
*G01D 5/353* (2006.01)

(52) U.S. Cl.
CPC ....... *G01D 5/35364* (2013.01); *G01D 5/3539* (2013.01)

(58) Field of Classification Search
CPC ......................... G01D 5/35364; G01D 5/3539
See application file for complete search history.

(56) References Cited

U.S. PATENT DOCUMENTS

2010/0040108 A1* 2/2010 Sasaoka ............ G01D 5/35358 385/12
2013/0341497 A1* 12/2013 Zuardy ............... G01M 5/0091 250/227.14
2023/0052444 A1 2/2023 Wilson et al.

FOREIGN PATENT DOCUMENTS

CN 1190860 8/1998
CN 106546218 A * 3/2017 ............ G01K 11/32
(Continued)

OTHER PUBLICATIONS

"International Search Report (Form PCT/ISA/210) of PCT/CN2023/119999", mailed on Apr. 23, 2024, pp. 1-3.

*Primary Examiner* — Jennifer D Bennett
(74) *Attorney, Agent, or Firm* — JC ONE WORLD

(57) ABSTRACT

The present disclosure discloses a massive submarine monitoring BOTDA system based on a mesh multi-stage remote pump amplification, which belongs to the technical field of measurement and testing. The submarine monitoring optical cables are laid in a mesh structure, seven special optical cable interfaces are adopted to connect two interlaced optical cables. Through these optical cable interfaces, the short-
(Continued)

est path routing and optimal power distribution of remote pumping light can be implemented, greatly shortening the passing distance and transmission loss of the remote pumping light reaching the far terminal of the sensing optical fiber, and implementing ultra long distance pumping. One part optical cable interfaces also contain passive gain units, which can targetedly amplify the probe light and the retrieval pulse of the BOTDA terminal, implementing constant gain amplification of the detection light and constant power output of the retrieval pulse, greatly expanding the available monitoring submarine area.

11 Claims, 11 Drawing Sheets

(56) References Cited

FOREIGN PATENT DOCUMENTS

| | | | | | |
|---|---|---|---|---|---|
| CN | 106570999 | | | 4/2017 | |
| CN | 106570999 | A | * | 4/2017 | ........... G08B 13/124 |
| CN | 106785833 | | | 5/2017 | |
| CN | 111156916 | A | * | 5/2020 | ............. G01B 11/18 |
| CN | 114754855 | | | 7/2022 | |
| CN | 116124025 | A | * | 5/2023 | ............. G01B 11/16 |

* cited by examiner

MASSIVE SUBMARINE MONITORING BOTDA SYSTEM BASED ON MESH MULTI-STAGE REMOTE PUMP AMPLIFICATION

CROSS-REFERENCE TO RELATED APPLICATION

This application is a 371 of international application of PCT application serial no. PCT/CN2023/119999, filed on Sep. 20, 2023, which claims the priority benefit of China application no. 202311059812.9, filed on Aug. 22, 2023. The entirety of each of the above-mentioned patent applications is hereby incorporated by reference herein and made a part of this specification.

TECHNICAL FIELD

The present disclosure relates to the fiber optic sensing technology, discloses a massive submarine monitoring BOTDA system based on a mesh multi-stage remote pump amplification, and belongs to the technical field of measurement and testing.

BACKGROUND

With the rapid developments of the marine economy, strengthening marine national defense and security, improving marine resource development capabilities, and protecting the marine ecological environment are increasingly valued as three complementary aspects. Effective sensing and detection technology are crucial for aspects such as ensuring marine safety, efficient resource development, real-time monitoring, and has become a hot research topic in the current marine field. Distributed optical fiber sensing adopts ordinary single mode optical fiber as both the sensing medium and the signal transmission medium, which can implement measurements of the physical quantities along the fiber in real time. Compared with the traditional ocean sensing technologies that use mobile buoys, drag sensor arrays, and other detection equipment, the distributed optical fiber sensing based on submarine optical cables has significant advantages in submarine monitoring systems due to its characteristic such as ultra long distance sensing and ease of large-scale networking.

Compared with distributed optical fiber sensing systems based on Rayleigh scattering, Raman scattering, and Spontaneous Brillouin scattering, the Brillouin Optical Time Domain Analysis (BOTDA) based on stimulated Brillouin scattering has the advantages such as ultra long sensing distance, simultaneous measurement of temperature and strain, and can play an important role in massive submarine monitoring. However, submarine monitoring systems currently adopt a network format to implement massive coverage, and this wiring method results in that the sensing optical fibers required are extremely long, posing a huge challenge to the sensing distance of the BOTDA system. At present, the main methods for expanding the sensing distance of the BOTDA system include distributed Raman amplification, remote pump amplification, and pulse coding technology, and the like. The available expand scopes of the pulse coding technology are limit and are difficult to satisfy the requirements of massive submarine monitoring systems. The distributed Raman amplification introduces problems such as Raman spontaneous emission noises, pump signal crosstalk, polarization dependent gain, which reduces the signal-to-noise ratio of the signal. In addition, even the high-order Raman amplification with high pump power is adopted, its effective amplification distance is limited. Above problems can be avoided by adopting the remote pump amplification, but conventional remote pump amplification is limited by the transmission loss of pumping light in optical fibers and cannot implement long distance pumping. In a case where the pumping source cannot be placed nearby, its sensing distance is also limited. Obviously, it is impossible to place a pump source of 1480 nm on the seabed, thus conventional remote pump amplification structures cannot implement massive submarine monitoring.

SUMMARY

In view of the technical problems mentioned in the above background, the objectives of the present disclosure are to provide a massive submarine monitoring BOTDA system based on a mesh multi-stage remote pump amplification, which achieves the objectives of the massive submarine monitoring.

In order to achieve the above objectives, the present disclosure adopts following technical solutions. Provided is a massive submarine monitoring BOTDA system based on a mesh multi-stage remote pump amplification. The system is composed of a BOTDA terminal, a group A of remote optically pumping sources that is composed of L pumping sources with wavelengths ranging from $\lambda_{A,1}$ to $\lambda_{A,L}$, and a group B of remote optically pumping sources that is composed of L pumping sources with wavelengths ranging from $\lambda_{B,1}$ to $\lambda_{B,L}$, M-section transverse submarine optical cables, N-section longitudinal submarine optical cables, (N-2) transverse branching optical cable interfaces, (M-2) longitudinal branching optical cable interfaces, (M-2) transverse dual gain optical cable interfaces, (N-2) longitudinal dual gain optical cable interfaces, one transverse single gain optical cable interface, one longitudinal single gain optical cable interface, and one bidirectional single gain optical cable interface. The M-section transverse submarine optical cables and the N-section longitudinal submarine optical cables are formed by laying one submarine monitoring optical cable and then connecting by the above seven types of optical cable interfaces at the intersections, and both N and M are odd numbers greater than or equal to 3.

The submarine monitoring BOTDA device includes a BOTDA system terminal, a group A of remote optically pumping sources, and a group B of remote optically pumping sources, the group A of the remote optically pumping sources includes L pumping sources with wavelengths ranging from $\lambda_{A,1}$ to $\lambda_{A,L}$, and the group B of the remote optically pumping sources includes L pumping sources with wavelengths ranging from $\lambda_{B,1}$ to $\lambda_{B,L}$. The retrieval pulse generated by the BOTDA system terminal and the group B of the pumping light enter an initial terminal of a monitoring optical cable, while probe light generated by the BOTDA system terminal and the group A of the pumping light enter the tail terminal of the monitoring optical cable.

Further, the submarine monitoring optical cable includes three groups of optical fibers, including a group A of pumping optical fibers, a group B of pumping optical fibers, and a sensing optical fiber $F_C$. The group A of the pumping optical fibers includes L optical fibers from $F_{A,1}$ to $F_{A,L}$, is configured to transmit the pumping light with the wavelengths ranging from $\lambda_{A,1}$ to $\lambda_{A,L}$. The group B of the pumping optical fiber includes L optical fibers from $F_{B,1}$ to $F_{B,L}$, is configured to transmit the pumping light with the wavelengths ranging from $\lambda_{B,1}$ to $\lambda_{B,L}$. The sensing optical fiber $F_C$ is configured to transmit the probe light and the retrieval pulse of the BOTDA and take the probe light and the retrieval pulse as a sensing medium.

Further, the submarine monitoring optical cable is firstly laid transversely for M times, subsequently laid longitudinally for N times, and eventually the submarine monitoring optical cable returns to its starting laying position, overall presented in an M×N mesh laying, where N and M are odd numbers greater than or equal to 3. The interiors of the optical cables are connected by using the optical cable interfaces at one part of the grid intersection points. The each section of the transverse optical cables is numbered in an ascending order from the initial laying position as 1, 2, . . . , i, . . . , M and the each section of the longitudinal optical cables is numbered in an ascending order from the initial laying position as 1, 2, . . . , j . . . , N by following an approach from near to far. Thus, the grid intersection points can be expressed as (j, i), and a grid intersection point (1, 1) does not exist. Since the longitudinal fiber optic cables are laid from the farthest place after the transverse fiber optic cables are completed laid, the first longitudinal fiber optic cable is actually the last fiber optic cable to be laid.

Further, on the first section transverse optical cable, at the grid intersection point (j, 1) except the intermediate grid intersection point ((N+1)/2, 1), that is, at grid intersection points of the first section transverse optical cable and each section of the longitudinal optical cables except a (N+1)/2-th section longitudinal optical cable, the transverse branching optical cable interfaces are used to connect the four sections, that is, the upper section, the lower section, the left section, and the right section of the optical cables. Each of the optical cable interfaces includes one optical power splitter and three dense wavelength division multiplexers. The first dense wavelength division multiplexer combines pumping light transmitted in the group B of the pumping optical fibers from $F_{B,1}$ to $F_{B,L}$ that is connected from a left terminal of the transverse branching optical cable interfaces, and splits combined pumping light into two paths through the optical power splitter, after being decomposed by the second dense wavelength division multiplexer and the third dense wavelength division multiplexer, the two paths respectively enter the corresponding optical fibers in the right terminal optical cables and upper terminal optical cables. The transverse sensing optical fibers $F_C$ at the left terminal and the right terminal of the transverse branching optical cable interfaces are directly connected with each other, and the longitudinal sensing optical fibers $F_C$ at the upper terminal and the lower terminal of the transverse branching optical cable interfaces are directly connected with each other.

Further, at the grid intersection point ((N+1)/2, 1) between the first section transverse optical cable and the (N+1)/2-th section longitudinal optical cable, a transverse single gain optical cable interface is used to connect the optical cables. The optical cable interface includes one optical power splitter, three dense wavelength division multiplexers, and one single source gain module. The first dense wavelength division multiplexer combines pumping light transmitted in the group B of the pumping optical fibers from $F_{B,1}$ to $F_{B,L}$ that is connected from a left terminal of the transverse single gain optical cable interface and splits combined pumping light into three paths through the optical power splitter, after being decomposed by the second dense wavelength division multiplexer and the third dense wavelength division multiplexer, the two paths of the three paths respectively enter the corresponding optical fibers in the upper terminal optical cables and right terminal optical cables. The other path is configured to pump the single source gain module in the optical cable interface and amplify the Brillouin retrieval pulse and the probe light transmitted transversely. The longitudinal sensing optical fibers $F_C$ at the upper terminal and the lower terminal of the transverse single gain optical cable interface are directly connected with each other, and the transverse sensing optical fibers $F_C$ at the left terminal and the right terminal of the transverse single gain optical cable interface are connected with the single source gain module.

Further, on the first section longitudinal optical cable, at the grid intersection point (1, i) except the intermediate grid intersection point (1, (M+1)/2), that is, grid intersection points of the first section longitudinal optical cable and each section of the longitudinal optical cables except a (M+1)/2-th section transverse optical cable, the longitudinal branching optical cable interfaces are used to connect the four sections, that is, the upper section, the lower section, the left section, and the right section, of the optical cables. Each of the optical cable interfaces includes one optical power splitter and three dense wavelength division multiplexers. The first dense wavelength division multiplexer combines pumping light transmitted in the group A of the pumping optical fibers from $F_{A,1}$ to $F_{A,L}$ that is connected from a lower terminal of the longitudinal branching optical cable interfaces and splits combined pumping light into two paths through the optical power splitter, after being decomposed by the second dense wavelength division multiplexer and the third dense wavelength division multiplexer, the two paths respectively enter the corresponding optical fibers in the right terminal optical cables and upper terminal optical cables. The transverse sensing optical fibers $F_C$ at the left terminal and the right terminal of the longitudinal branching optical cable interfaces are directly connected with each other, and the longitudinal sensing optical fibers $F_C$ at the upper terminal and the lower terminal of the longitudinal branching optical cable interfaces are directly connected with each other.

Further, at the grid intersection point (1, (M+1)/2) between the first section longitudinal optical cable and the (M+1)/2-th section transverse optical cable, a longitudinal single gain optical cable interface is used to connect the optical cables. The longitudinal single gain optical cable interface includes one optical power splitter, three dense wavelength division multiplexers, and one single source gain module. The first dense wavelength division multiplexer combines pumping light transmitted in the group A of the pumping optical fibers from $F_{A,1}$ to $F_{A,L}$ that is connected from a lower terminal of the longitudinal single gain optical cable interface and splits combined pumping light into three paths through the optical power splitter, after being decomposed by the second dense wavelength division multiplexer and the third dense wavelength division multiplexer, the two paths of the three paths respectively enter the corresponding optical fibers in the upper terminal optical cables and right terminal optical cables. The other path is configured to pump the single source gain module in the optical cable interface and amplify the Brillouin retrieval pulse and the probe light transmitted longitudinally. The transverse sensing optical fibers $F_C$ at the left terminal and the right terminal of the longitudinal single gain optical cable interface are directly connected with each other, and the longitudinal sensing optical fibers $F_C$ at the upper terminal and the lower terminal of the longitudinal single gain optical cable interface are connected with the single source gain module.

Further, at the grid intersection point (j, (M+1)/2) between the (M+1)/2-th section transverse optical cable and each of the longitudinal optical cables except the first longitudinal optical cable and the (N+1)/2-th section longitudinal optical cable, the longitudinal dual gain optical cable interface is used. The longitudinal dual gain optical cable interface includes one optical power splitter, three dense wavelength division multiplexers, and one dual source gain module. The first dense wavelength division multiplexer combines pumping light transmitted in the group A of the pumping optical fibers from $F_{A,1}$ to $F_{A,L}$ that is connected from a left terminal of the longitudinal dual gain optical cable interface and splits combined pumping light into two paths through the optical power splitter, after being decomposed by the second dense wavelength division multiplexer, one path enters the corresponding optical fibers in the right terminal optical cables. The other path enters dual source gain module inside the optical cable interface and amplifies the Brillouin retrieval pulse and the probe light transmitted longitudinally. At the same time, the third dense wavelength division multiplexer combines pumping lights transmitted in the group B pumping optical fibers from $F_{B,1}$ to $F_{B,L}$ that is connected from a lower terminal of the longitudinal dual gain optical cable interface and directly transmits into the dual source gain module, and amplifies the Brillouin retrieval pulse and the probe light transmitted longitudinally. The transverse sensing optical fibers $F_C$ at the left terminal and the right terminal of the longitudinal dual gain optical cable interface are directly connected with each other, and the longitudinal sensing optical fibers $F_C$ at the upper terminal and the lower terminal of the longitudinal dual gain optical cable interface are connected with the dual source gain module.

Further, at the grid intersection point ((N+1)/2, i) between the (N+1)/2-th section longitudinal optical cable and each of the transverse optical cables except the first transverse optical cable and the (M+1)/2-th section transverse optical cable, the transverse dual gain optical cable interface is used. The optical cable interface includes one optical power splitter, three dense wavelength division multiplexers, and one dual source gain module. The first dense wavelength division multiplexer combines pumping light transmitted in the group B of the pumping optical fibers from $F_{B,1}$ to $F_{B,L}$ that is connected from a lower terminal of the transverse dual gain optical cable interface and splits combined pumping light into two paths through the optical power splitter, after being decomposed by the second dense wavelength division multiplexer, one path enters the corresponding optical fibers in the upper terminal optical cables. The other path enters dual source gain module inside the optical cable interface and amplifies the Brillouin retrieval pulse and the probe light transmitted transversely. At the same time, the third dense wavelength division multiplexer combines pumping light transmitted in the group A of the pumping optical fibers from $F_{A,1}$ to $F_{A,L}$ that is connected from a left terminal of the longitudinal dual gain optical cable interface and directly transmits into the dual source gain module, and amplifies the Brillouin retrieval pulse and the probe light transmitted transversely. The longitudinal sensing optical fibers $F_C$ at the upper terminal and the lower terminal of the transverse dual gain optical cable interface are directly connected with each other, and the transverse sensing optical fibers $F_C$ at the left terminal and the right terminal of the transverse dual gain optical cable interface are connected with the dual source gain module.

Further, at the grid intersection point ((N+1)/2, (M+1)/2) between the (M+1)/2-th section transverse optical cable and the (N+1)/2-th section longitudinal optical cable, the bidirectional single gain optical cable interface is used. The bidirectional single gain optical cable interface includes two optical power splitter, four dense wavelength division multiplexers, and two single source gain modules. The first dense wavelength division multiplexer combines pumping light transmitted in the group A of the pumping optical fibers from $F_{A,1}$ to $F_{A,L}$ that is connected from a left terminal of the bidirectional single gain optical cable interface and splits combined pumping light into two paths through the first optical power splitter, after being decomposed by the second dense wavelength division multiplexer, one path enters the corresponding optical fibers in the right terminal optical cables. The other path enters the first single source gain module inside the optical cable interface and amplifies the Brillouin retrieval pulse and the probe light transmitted transversely. The third dense wavelength division multiplexer combines pumping light transmitted in the group B of the pumping optical fibers from $F_{B,1}$ to $F_{B,L}$ that is connected from a lower terminal of the bidirectional single gain optical cable interface, and then splits the combined light into two paths through the second optical power splitter. After being decomposed by the fourth dense wavelength division multiplexer, one path enters the corresponding optical fibers in the upper terminal optical cables. The other path enters the second single source gain module inside the optical cable interface and amplifies the Brillouin retrieval pulse and the probe light transmitted longitudinally. The longitudinal sensing optical fibers $F_C$ at the upper terminal and the lower terminal of the bidirectional single gain optical able interface are connected with the second single source gain module, and the transverse sensing optical fibers $F_C$ at the left terminal and the right terminal of the bidirectional single gain optical cable interface are connected with the first single source gain module.

Further, the single source gain module is composed of one optical power splitter, two optical circulators, two wavelength division multiplexers, two sections of the erbium-doped fibers, and two filters. The retrieval pulse is input from the sensing fiber at one terminal and enters the lower amplification branch through the first optical circulator. The probe light is input from the other terminal of the sensing fiber and then enters the upper amplification branch through the second optical circulator. The remote pumping light is input from the lower fiber and is decomposed into two parts through one optical power splitter, and the two parts enter the two amplification branches respectively. The structures of the upper and lower amplification branches are basically the same. Firstly, the remote pumping light and the BOTDA retrieval pulse or the remote pumping light and probe light are combined through a wavelength division multiplexer and subsequently output through one section of the erbium-doped fiber, a filter, and an optical circulator, and eventually output through another sensing fiber. The module can targetedly amplify the probe light and the retrieval pulse of the BOTDA system using the remote pumping light with one wavelength.

Further, the dual source gain module is composed of three dense wavelength division multiplexers and one single source gain module. Firstly, the group A of the pumping light and the group B of the pumping light are decomposed respectively through the first dense wavelength division multiplexer and the second dense wavelength division multiplexer. Subsequently, all pumping light is combined into the pumping light of the erbium-doped fiber through the third dense wavelength division multiplexer, and eventually input into the single source gain module. The module can simultaneously utilize the remote pumping light with two wavelength to increase the available remote pumping light power.

The present disclosure adopts the above technical solutions, and has the following significant beneficial effects compared to the prior art.

(1) The present disclosure proposes a massive submarine monitoring BOTDA system based on the mesh multi-stage remote pump amplification. The submarine monitoring optical cable is laid in a network structure, which solves the problems of limited transmission distances of remote pumping light in the traditional remote pump amplification BOTDA, implements truly relay-free mesh multi-stage remote pump amplification, reduces non-local effects of BOTDA, improves sensing signal strength and measurement accuracy, and greatly expands the available monitoring submarine area.

(2) The present disclosure designs seven special optical cable interfaces for connecting two interlaced optical cables. Through these optical cable interfaces, the shortest path routing and optimal power allocations of the pumping light around 1480 nm can be implemented, and effective amplifications of the retrieval pulse and probe light in the BOTDA system can be implemented. Based on these optical cable interfaces and the mesh distributed optical cables, the passing distance and loss of the remote pumping light reaching the far terminal of the sensing fiber are greatly reduced, implementing ultra long distance pumping and high-power pulse amplification.

(3) The present disclosure designs a single source gain unit that can targetedly amplify the probe light and retrieval pulse of the BOTDA terminal, implementing constant gain amplification of the probe light and constant power output of the retrieval pulse, effectively improving signal strength while suppressing non-local effects in BOTDA.

(4) The present disclosure designs a dual source gain unit that can simultaneously amplify signals by utilizing two groups of remote pumping light with different wavelengths, increasing the pumping light power input into erbium-doped fibers, weakening the limitations caused by excessive pumping light loss during the long-distance transmission, further improving the pumped range, and expanding the sensing range.

Figure 1:
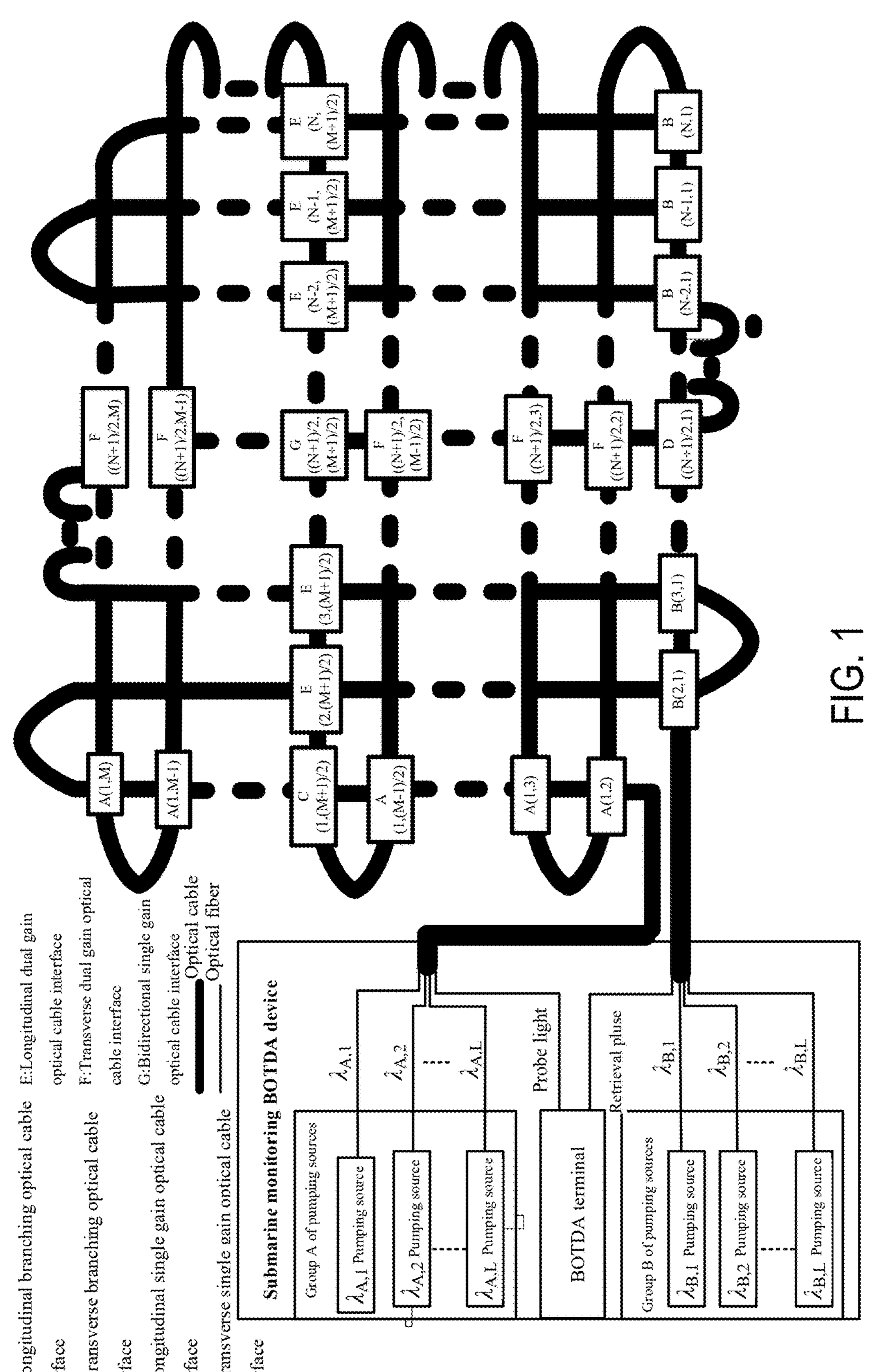
FIG. 1 illustrates a massive submarine monitoring BOTDA system based on a mesh multi-stage remote pump amplification with M-section transverse optical cables and N-section longitudinal optical cables.

Relevant numerals in the drawings: DWDM1 to DWDM4, the first dense wavelength division multiplexer to the fourth dense wavelength division multiplexer; WDM1 to WDM2, the first wavelength division multiplexer to the second wavelength division multiplexer.

DETAILED DESCRIPTION OF THE EMBODIMENTS

The present disclosure will be further clarified below in conjunction with the accompanying drawings.

As illustrated in FIG. 1, provided is a massive submarine monitoring BOTDA system based on a mesh multi-stage remote pump amplification. The system is composed of a BOTDA terminal, a group A of optically pumping sources that is composed of L sources with wavelengths ranging from $\lambda_{A,1}$ to $\lambda_{A,L}$, and a group B of optically pumping sources that is composed of L pumping sources with wavelengths ranging from $\lambda_{B,1}$ to $\lambda_{B,L}$, M-section transverse submarine optical cables, N-section longitudinal submarine optical cables, (N-2) transverse branching optical cable interfaces, (M-2) longitudinal branching optical cable interfaces, (M-2) transverse dual gain optical cable interfaces, (N-2) longitudinal dual gain optical cable interfaces, one transverse single gain optical cable interface, one longitudinal single gain optical cable interface, and one bidirectional single gain optical cable interface. The N-section longitudinal submarine optical cables and the M-section transverse submarine optical cables are connected with each other by laying one submarine optical cable, and both N and M are odd numbers greater than or equal to 3. The submarine monitoring optical cable includes three groups optical fibers, including a group A of pumping optical fibers, a group B of pumping optical fibers, and a sensing optical fiber $F_C$. The group A of the pumping optical fibers includes L optical fibers from $F_{A,1}$ to $F_{A,L}$, is configured to transmit the pumping light with the wavelengths ranging from $\lambda_{A,1}$ to $\lambda_{A,L}$. The group B of the pumping optical fibers includes L optical fibers from $F_{B,1}$ to $F_{B,L}$, is configured to transmit the pumping light with the wavelengths ranging from $\lambda_{B,1}$ to $\lambda_{B,L}$. The sensing optical fiber $F_C$ is configured to transmit the probe light and the retrieval pulse of the BOTDA and take the probe light and the retrieval pulse as a sensing medium. The retrieval pulse generated by the BOTDA system terminal and the group B of the pumping light enter an initial terminal of a monitoring optical cable, the probe light generated by the BOTDA system terminal and the group A of the pumping light enter a tail terminal of the monitoring optical cable.

The submarine monitoring optical cable is firstly laid transversely for M times, subsequently laid longitudinally for N times, and eventually the submarine monitoring optical cable returns to its starting laying position, overall presented in an M×N mesh laying, where N and M are odd numbers greater than or equal to 3. The interiors of the optical cables are connected by using the optical cable interfaces at one part of the grid intersection points. The each section of the transverse optical cables is numbered in an ascending order from the initial laying position as 1, 2, . . . , i, . . . , M and the each section of the longitudinal optical cables is numbered in an ascending order from the initial laying position as 1, 2, . . . , j . . . , N by following an approach from near to far. Thus, the grid intersection points can be expressed as (j, i), and a grid intersection point (1, 1) does not exist. Since the longitudinal fiber optic cables are laid from the farthest place after the transverse fiber optic cables are completed laid, the first longitudinal fiber optic cable is actually the last fiber optic cable to be laid.

At the grid intersection point (j, 1) (j≠vN+1)/2) on the first section transverse optical cable, a transverse branching optical cable interface B is used to connect the four sections, that is, the upper section, the lower section, the left section, and the right section of the optical cables. At the grid intersection point, that is the intermediate gird intersection point ((N+1)/2, 1) between the first section transverse optical cable and the (N+1)/2-th section longitudinal optical cable, a transverse single gain optical cable interface D is used to connect the optical cables. At the grid intersection point between the (M+1)/2-th transverse optical cable and the longitudinal optical cable, that is, the gird intersection point (j, (M+1)/2) (j≠1, (N+1)/2) of the intermediate transverse optical fiber, a longitudinal dual gain optical cable interface E is used to connect the optical cables. At the grid intersection point between the (N+1)/2-th longitudinal optical cable and the transverse optical cable, that is, the gird intersection point ((N+1)/2, i) (i≠1, (M+1)/2) of the intermediate longitudinal optical fiber, a transverse dual gain optical cable interface F is used to connect the optical cables. At the grid intersection point between the (M+1)/2-th transverse optical cable and the (N+1)/2-th longitudinal optical cable, that is, the intermediate gird intersection point ((N+1)/2, (M+1)/2), a bidirectional single gain optical cable interface G is used to connect the four sections, that is, the upper section, the lower section, the left section, and the right section of the optical cables.

The probe light and the retrieval pulse of the BOTDA system permanently transmit toward each other along the sensing fiber $F_C$ in the optical cable, and are amplified at each fiber optic interface with gain to weaken the losses caused by the fiber transmission, thus the probe light and the retrieval pulse permanently remain at relative high power, and the measurement accuracy of the system remains at a relative high level.

Figure 2:
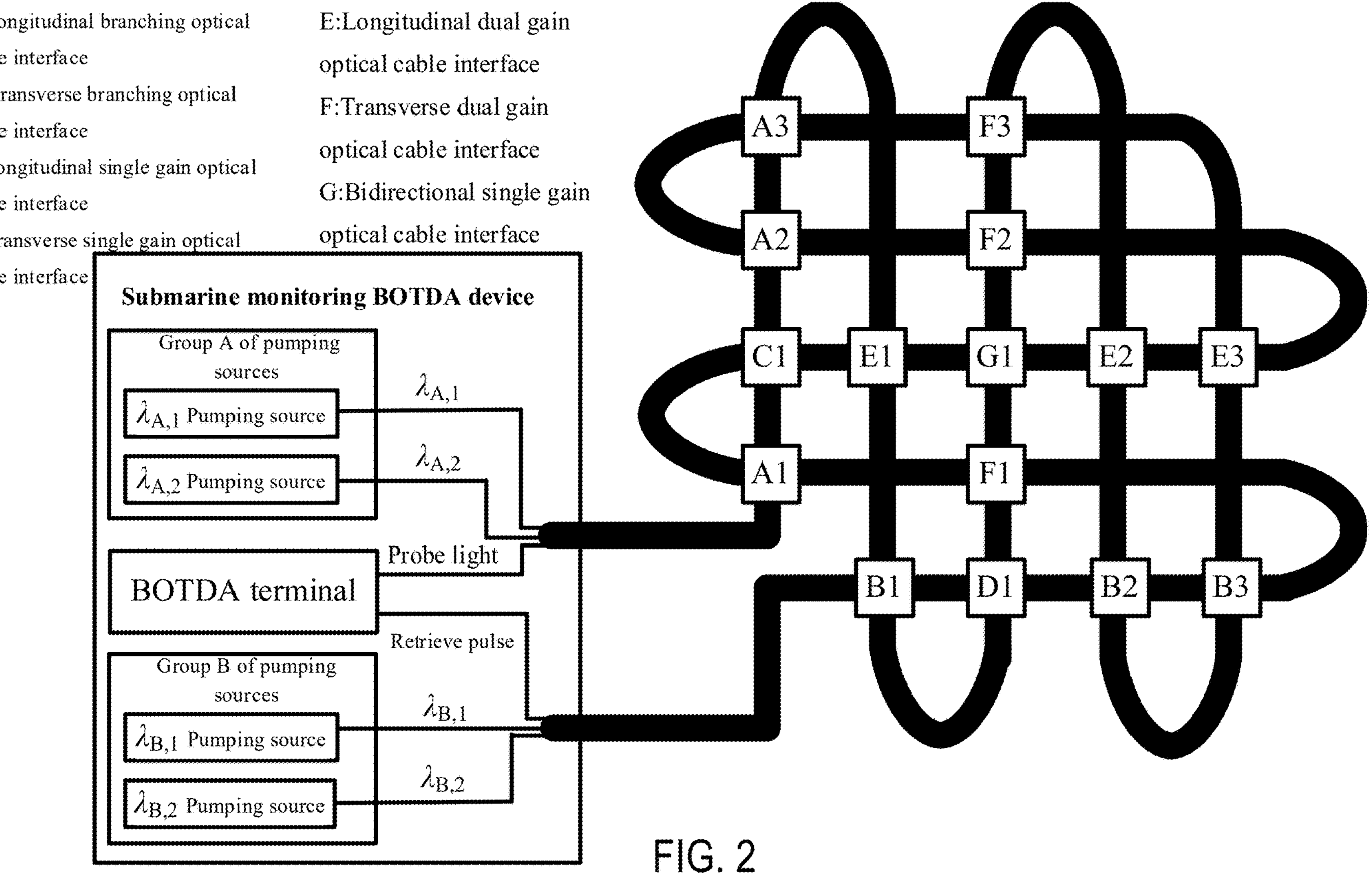
FIG. 2 illustrates a massive submarine monitoring BOTDA system based on a mesh multi-stage remote pump amplification with five section transverse optical cables and five section longitudinal optical cables.

As illustrated in FIG. 2, a massive submarine monitoring BOTDA system based on a mesh multi-stage remote pump amplification in this embodiment includes a BOTDA terminal, a pumping source A composed of two pumping sources with 1480 nm and 1480.2 nm, a pump source B composed of two pumping sources with 1481 nm and 1481.2 nm, five section transverse submarine optical cables, five section longitudinal submarine optical cables, three transverse branching optical cable interfaces B1 to B3, three longitudinal branching optical cable interfaces A1 to A3, three transverse dual gain optical cable interfaces F1 to F3, three longitudinal dual gain optical cable interfaces E1 to E3, one transverse single gain optical cable interface D1, one longitudinal single gain optical cable interface C1, and one bidirectional single gain optical cable interface G1. Five section transverse submarine cables and five section longitudinal submarine cables are connected with each other by laying one submarine optical cable. The submarine monitoring optical cable includes three groups of optical fibers, including the group A of the pumping optical fibers, the group B of the pumping optical fibers, and the sensing fiber $F_C$. The group A of the pumping optical fibers includes two fibers from $F_{A,1}$ to $F_{A,2}$, is configured to transmit pumping light of 1480 nm and 1480.2 nm. The group B of the pumping optical fibers includes two fibers from $F_{B,1}$ to $F_{B,2}$, is configured to transmit pumping light of 1481 nm and 1481.2 nm. The fiber $F_C$ is configured to transmit the probe light and the retrieval pulse of the BOTDA and take the probe light and the retrieval pulse as a sensing medium. The remote pumping light of 1481 nm and 1481.2 nm enters from the initial terminal of the optical cable along with the BOTDA retrieval pulse, while the remote pumping light of 1480 nm and 1480.2 nm enters from the end terminal of the optical cable along with the BOTDA probe light. The probe light and retrieval pulse of the BOTDA system transmit toward each other along the sensing fiber $F_C$ in the optical cable. The group A of the pumping light and the group B of the pumping light are decomposed at each optical cable interface and enter the next optical cable interface or are absorbed by the passive gain module inside the optical cable interface for amplifying the sensing signal.

Figure 3:
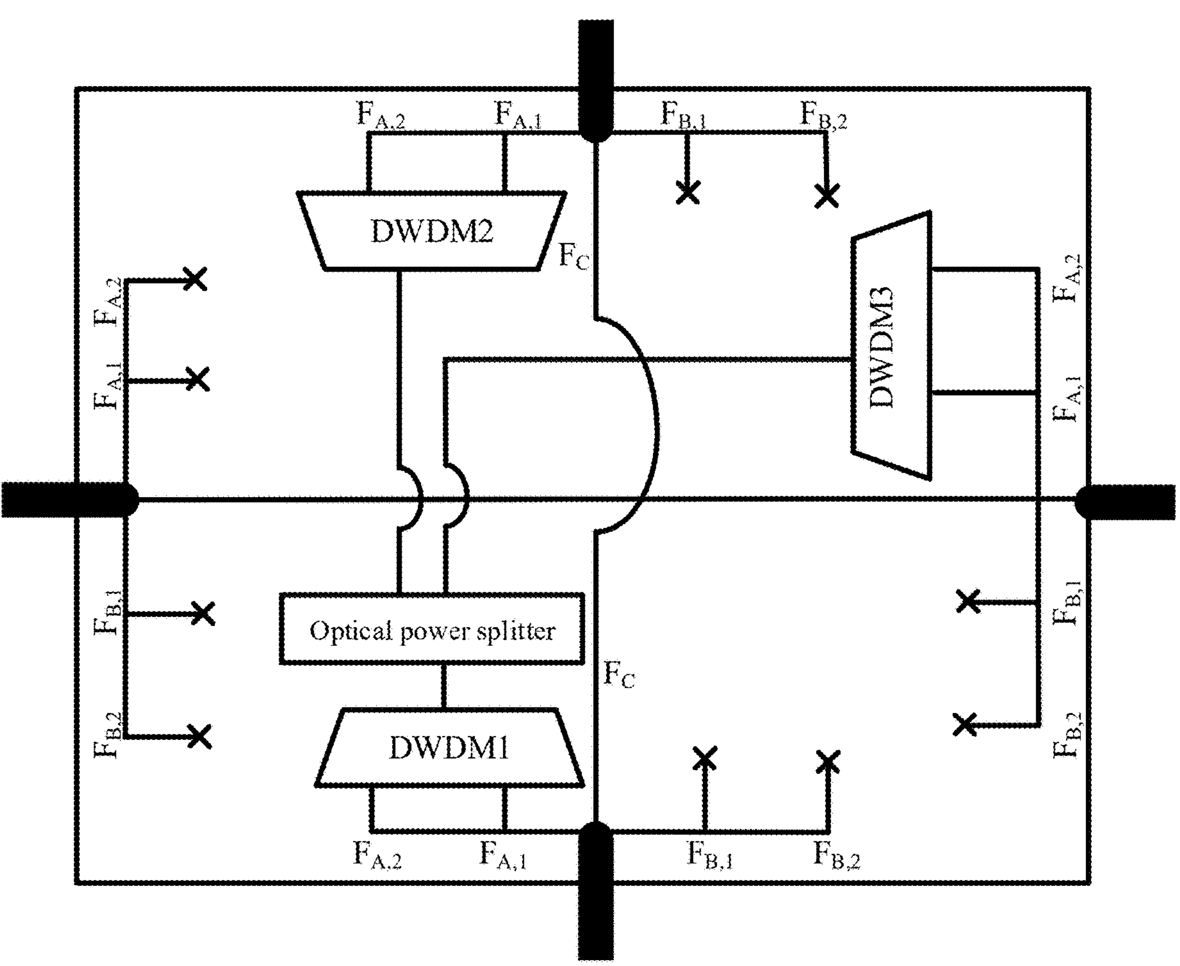
FIG. 3 illustrates a structural diagram of a longitudinal branching optical cable interface.

FIG. 3 illustrates a structural diagram of the longitudinal branching optical cable interface. The first dense wavelength division multiplexer DWDM1 combines the pumping light of 1480 nm and 1480.2 nm that is transmitted in the $F_{A,1}$ to $F_{A,2}$ together, and then the combined light is divided into two paths through the optical power splitter. After being decomposed by the second dense wavelength division multiplexer DWDM2 and the third dense wavelength division multiplexer DWDM3, the two paths respectively enter the corresponding optical fibers in the upper terminal optical cables and right terminal optical cables. The transverse sensing optical fibers $F_C$ at the left terminal and the right terminal of the longitudinal branching optical cable interfaces are directly connected with each other, and the longitudinal sensing optical fibers $F_C$ at the upper terminal and the lower terminal of the longitudinal branching optical cable interface are directly connected with each other.

Figure 4:
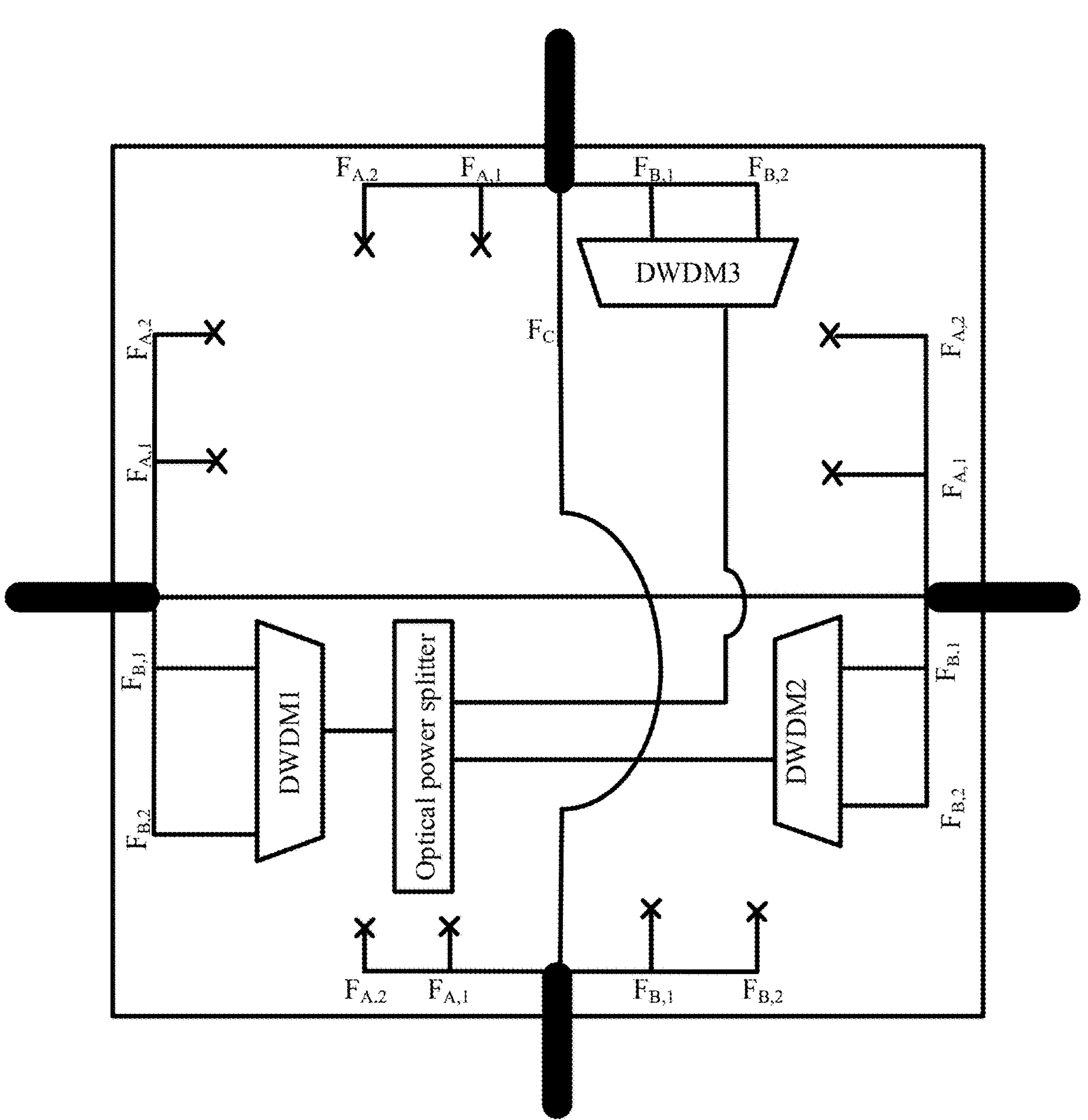
FIG. 4 illustrates a structural diagram of a transverse branching optical cable interface.

FIG. 4 illustrates a structural diagram of the transverse branching optical cable interface. The first dense wavelength division multiplexer DWDM1 combines the pumping light of 1481 nm and 1481.2 nm that is transmitted in the $F_{B,1}$ and $F_{B,2}$ together, and then the combined light is divided into two paths through the optical power splitter. After being decomposed by the second dense wavelength division multiplexer DWDM2 and the third dense wavelength division multiplexer DWDM3, the two paths respectively enter the corresponding optical fibers in the right terminal optical cables and upper terminal optical cables. The transverse sensing optical fibers $F_C$ at the left terminal and the right terminal of the transverse branching optical cable interfaces are directly connected with each other, and the longitudinal sensing optical fibers $F_C$ at the upper terminal and the lower terminal of the transverse branching optical cable interface are directly connected with each other.

Figure 5:
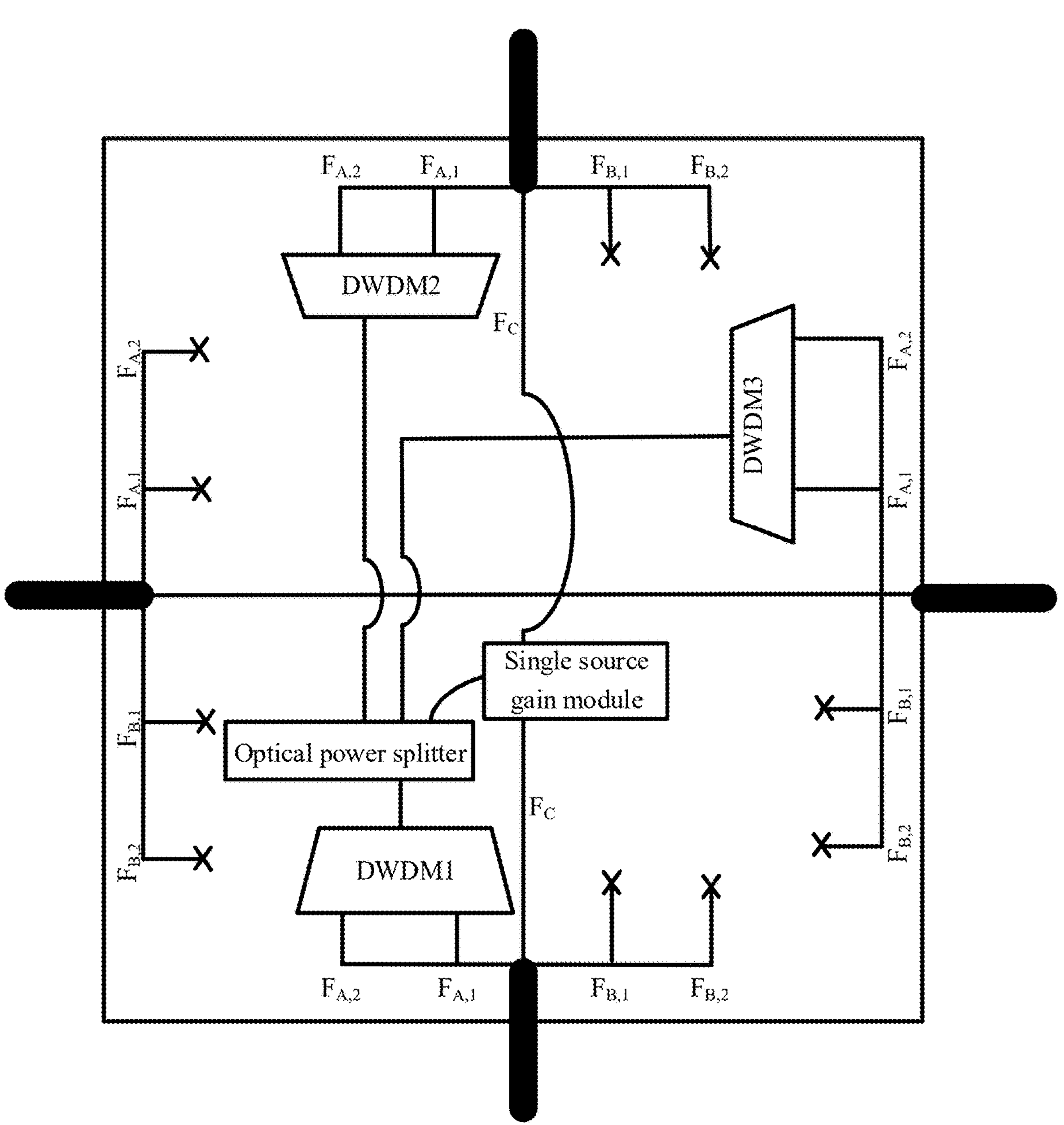
FIG. 5 illustrates a structural diagram of a longitudinal single gain optical cable interface.

FIG. 5 illustrates a structural diagram of the longitudinal single gain optical cable interface. The first dense wavelength division multiplexer DWDM1 combines the pumping light of 1480 nm and 1480.2 nm that is transmitted in the $F_{A,1}$ and $F_{A,2}$ together, and then the combined light is decomposed into three paths through the optical power splitter. After being decomposed by the second dense wavelength division multiplexer DWDM2 and the third dense wavelength division multiplexer DWDM3, two paths of the three paths respectively enter the corresponding optical fibers in the upper terminal optical cables and right terminal optical cables. The other path is configured to pump the single source gain module in the optical cable interface and amplify the Brillouin retrieval pulse and the probe light transmitted longitudinally. The transverse sensing optical fibers $F_C$ at the left terminal and the right terminal of the longitudinal single gain optical cable interface are directly connected with each other, and the longitudinal sensing optical fibers $F_C$ at the upper terminal and the lower terminal of the longitudinal single gain optical cable interface are connected with the single source gain module.

Figure 6:
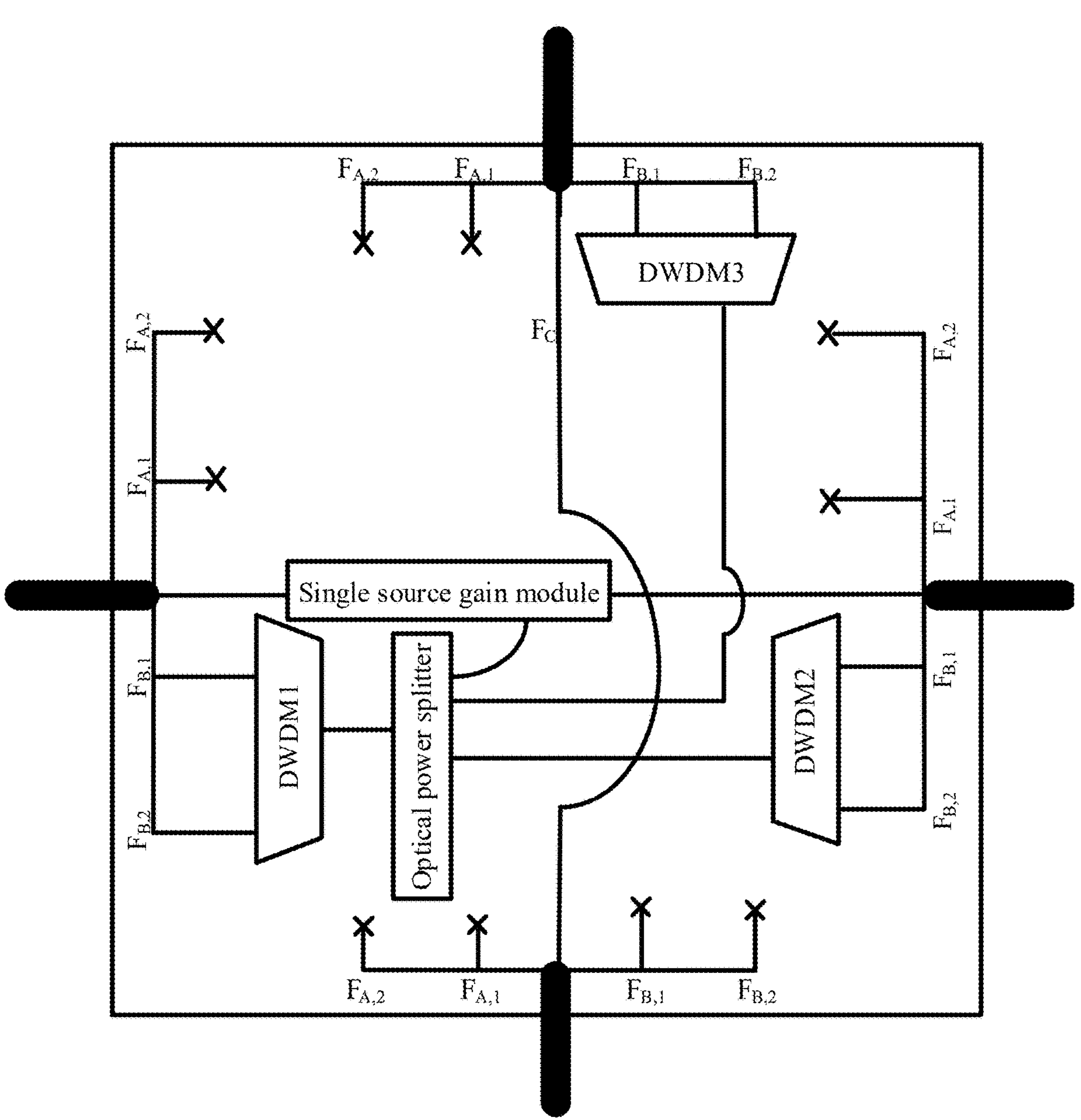
FIG. 6 illustrates a structural diagram of a transverse single gain optical cable interface.

FIG. 6 illustrates a structural diagram of the transverse single gain optical cable interface. The first dense wavelength division multiplexer DWDM1 combines the pumping light of 1481 nm and 1481.2 nm that is transmitted in the $F_{B,1}$ and $F_{B,2}$ together, and then the combined light is decomposed into three paths through the optical power splitter. After being decomposed by the second dense wavelength division multiplexer DWDM2 and the third dense wavelength division multiplexer DWDM3, the two paths of the three paths respectively enter the corresponding optical fibers in the right terminal optical cables and upper terminal optical cables. The other path is configured to pump the single source gain module in the optical cable interface and amplify the Brillouin retrieval pulse and the probe light transmitted transversely. The longitudinal sensing optical fibers $F_C$ at the upper terminal and the lower terminal of the transverse single gain optical cable interface are directly connected with each other, and the transverse sensing optical fibers $F_C$ at the left terminal and the right terminal of the transverse single gain optical cable interface are connected with the single source gain module.

Figure 7:
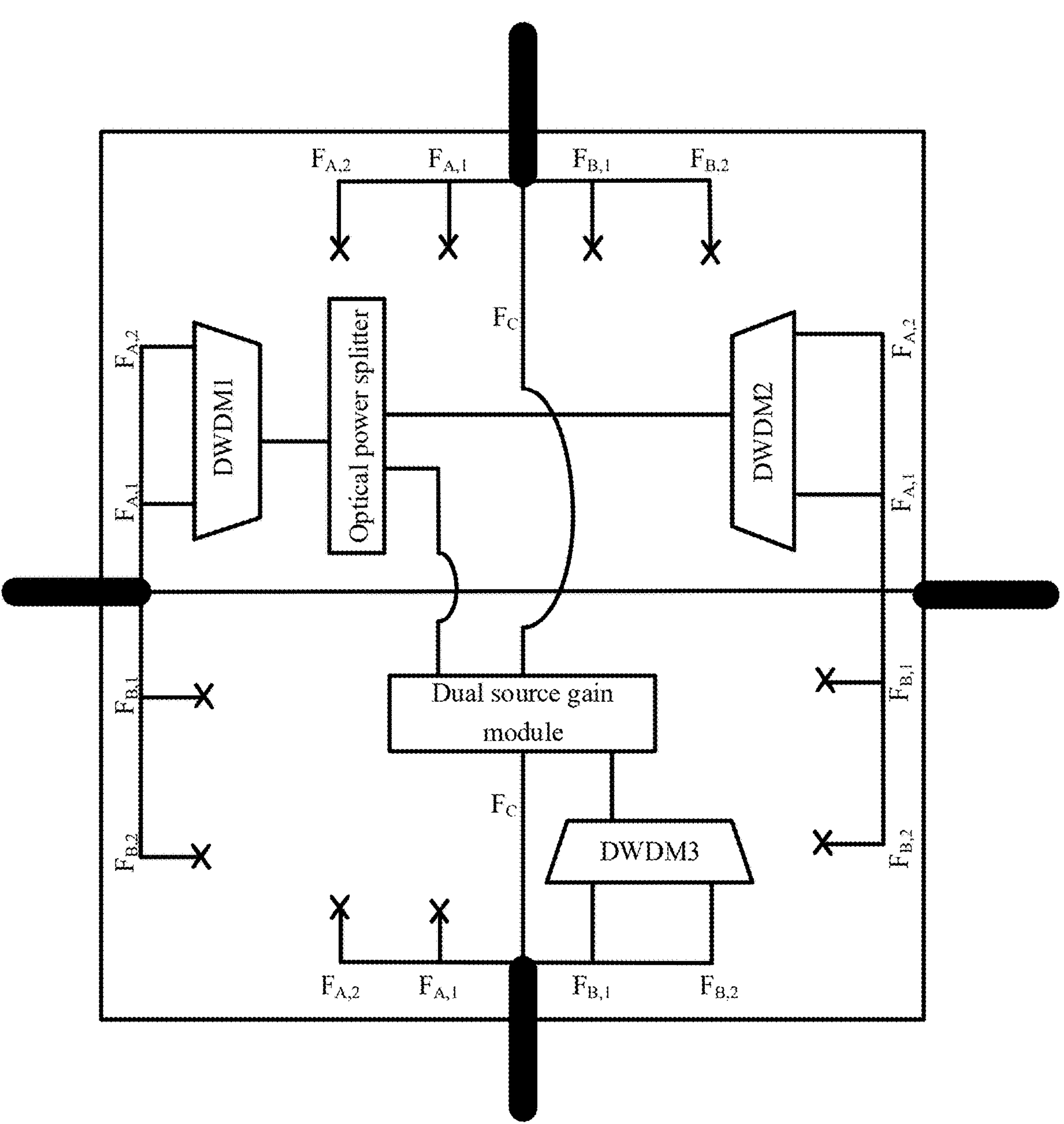
FIG. 7 illustrates a structural diagram of a longitudinal dual gain optical cable interface.

FIG. 7 illustrates a structural diagram of the longitudinal dual gain optical cable interface. The first dense wavelength division multiplexer DWDM1 combines the pumping light of 1480 nm and 1480.2 nm that is transmitted in the $F_{A,1}$ and $F_{A,2}$ at the left terminal together, and then the combined light is divided into two paths through the optical power splitter. After being decomposed by the second dense wavelength division multiplexer DWDM2, one path enters the corresponding optical fibers in the right terminal optical cables. The other path enters dual source gain module inside the optical cable interface and amplify the Brillouin retrieval pulse and the probe light transmitted longitudinally. At the same time, the third dense wavelength division multiplexer DWDM3 combines pumping light of 1481 nm and 1481.2 nm transmitted in the $F_{B,1}$ to $F_{B,2}$ at the lower terminal and directly transmits the combined pumping light into the dual source gain module, and amplify the Brillouin retrieval pulse and the probe light transmitted longitudinally. The transverse sensing optical fibers $F_C$ at the left terminal and the right terminal of the longitudinal dual gain optical cable interface are directly connected with each other, and the longitudinal sensing optical fibers $F_C$ at the upper terminal and the lower terminal of the longitudinal dual gain optical cable interface are connected with the dual source gain module.

Figure 8:
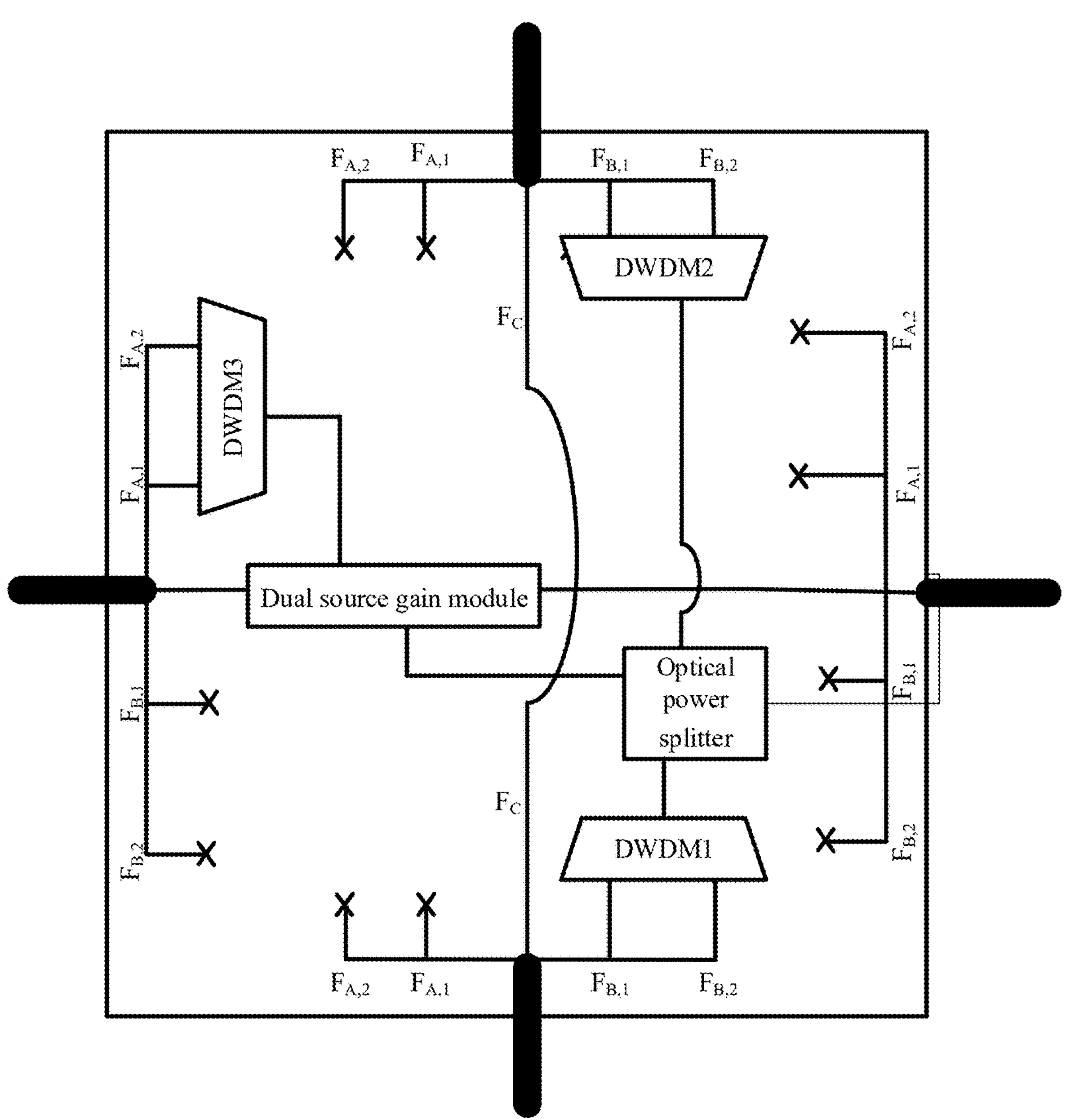
FIG. 8 illustrates a structural diagram of a transverse dual gain optical cable interface.

FIG. 8 illustrates a structural diagram of the transverse dual gain optical cable interface. The first dense wavelength division multiplexer DWDM1 combines the pumping light of 1481 nm and 1481.2 nm that is transmitted in the $F_{B,1}$ and $F_{B,2}$ at the lower terminal together, and then the combined light is divided into two paths through the optical power splitter. After being decomposed by the second dense wavelength division multiplexer DWDM2, one path enters the corresponding optical fibers in the upper terminal optical cables. The other path enters dual source gain module inside the optical cable interface and amplify the Brillouin retrieval pulse and the probe light transmitted transversely. At the same time, the third dense wavelength division multiplexer DWDM3 combines pumping light of 1480 nm and 1480.2 nm transmitted in the $F_{A,1}$ to $F_{A,2}$ at the left terminal and directly transmits the combined pumping light into the dual source gain module, and amplify the Brillouin retrieval pulse and the probe light transmitted transversely. The transverse sensing optical fibers $F_C$ at the upper terminal and the lower terminal of the transverse dual gain optical cable interface are directly connected with each other, and the longitudinal sensing optical fibers $F_C$ at the left terminal and the right terminal of the transverse dual gain optical cable interface are connected with the dual source gain module.

Figure 9:
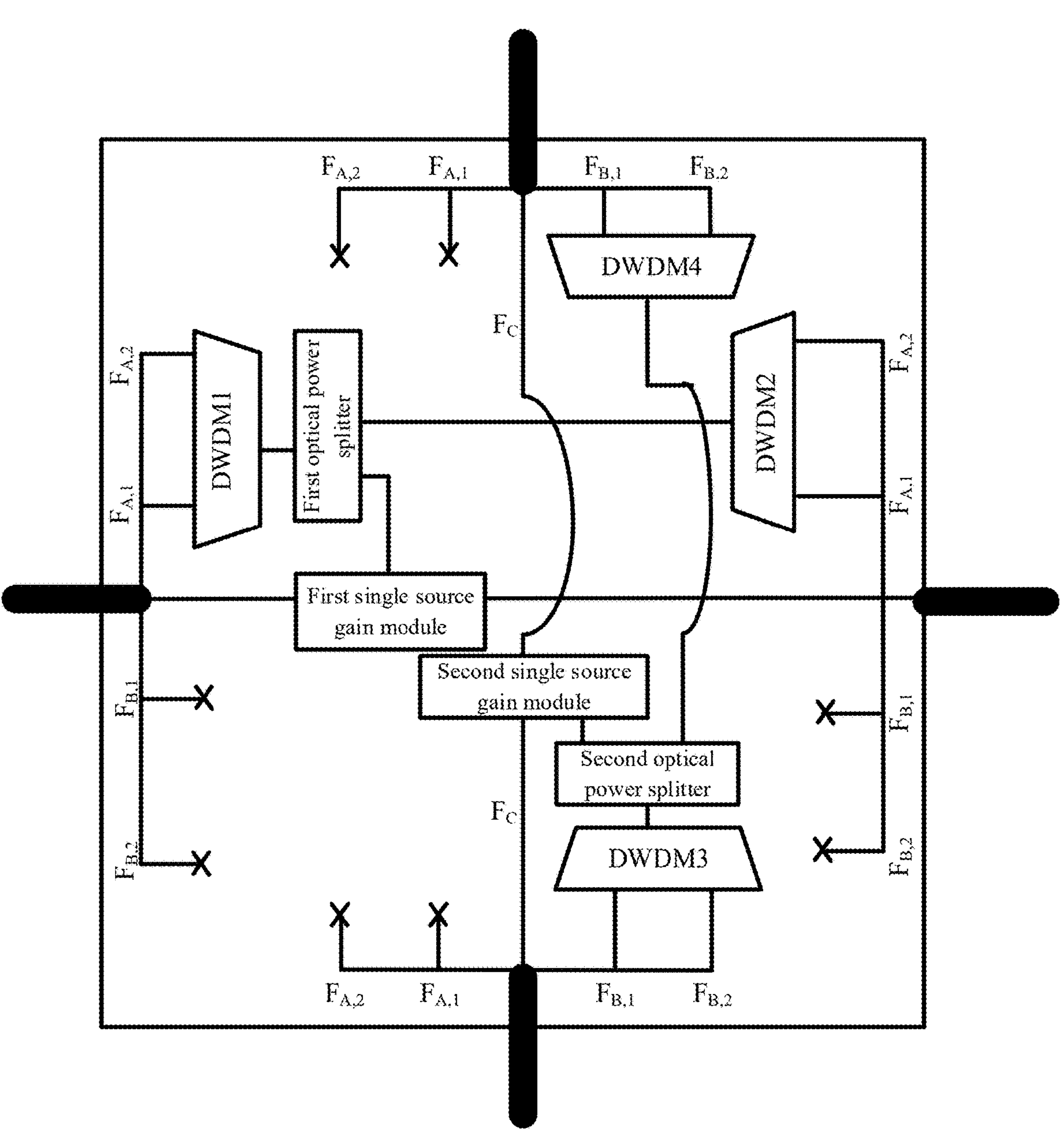
FIG. 9 illustrates a structural diagram of a bidirectional single gain optical cable interface.

FIG. 9 illustrates a structural diagram of the bidirectional single gain optical cable interface. The first dense wavelength division multiplexer DWDM1 combines the pumping light of 1480 nm and 1480.2 nm that is transmitted in the $F_{A,1}$ and $F_{A,2}$ at the left terminal together, and then the combined light is divided into two paths through the first optical power splitter. After being decomposed by the second dense wavelength division multiplexer DWDM2, one path enters the corresponding optical fibers in the right terminal optical cables. The other path enters the first single source gain module inside the optical cable interface and amplify the Brillouin retrieval pulse and the probe light transmitted transversely. The third dense wavelength division multiplexer DWDM3 combines pumping light of 1481 nm and 1481.2 nm transmitted in the $F_{B,1}$ to $F_{B,2}$ at the lower terminal and then decompose the combined light into two paths through the second optical power splitter. After being decomposed by the fourth dense wavelength division multiplexer DWDM4, one path enters the corresponding optical fibers in the upper terminal optical cables. The other path enters the second single source gain module inside the optical cable interface and amplify the Brillouin retrieval pulse and the probe light transmitted longitudinally.

Figure 10:
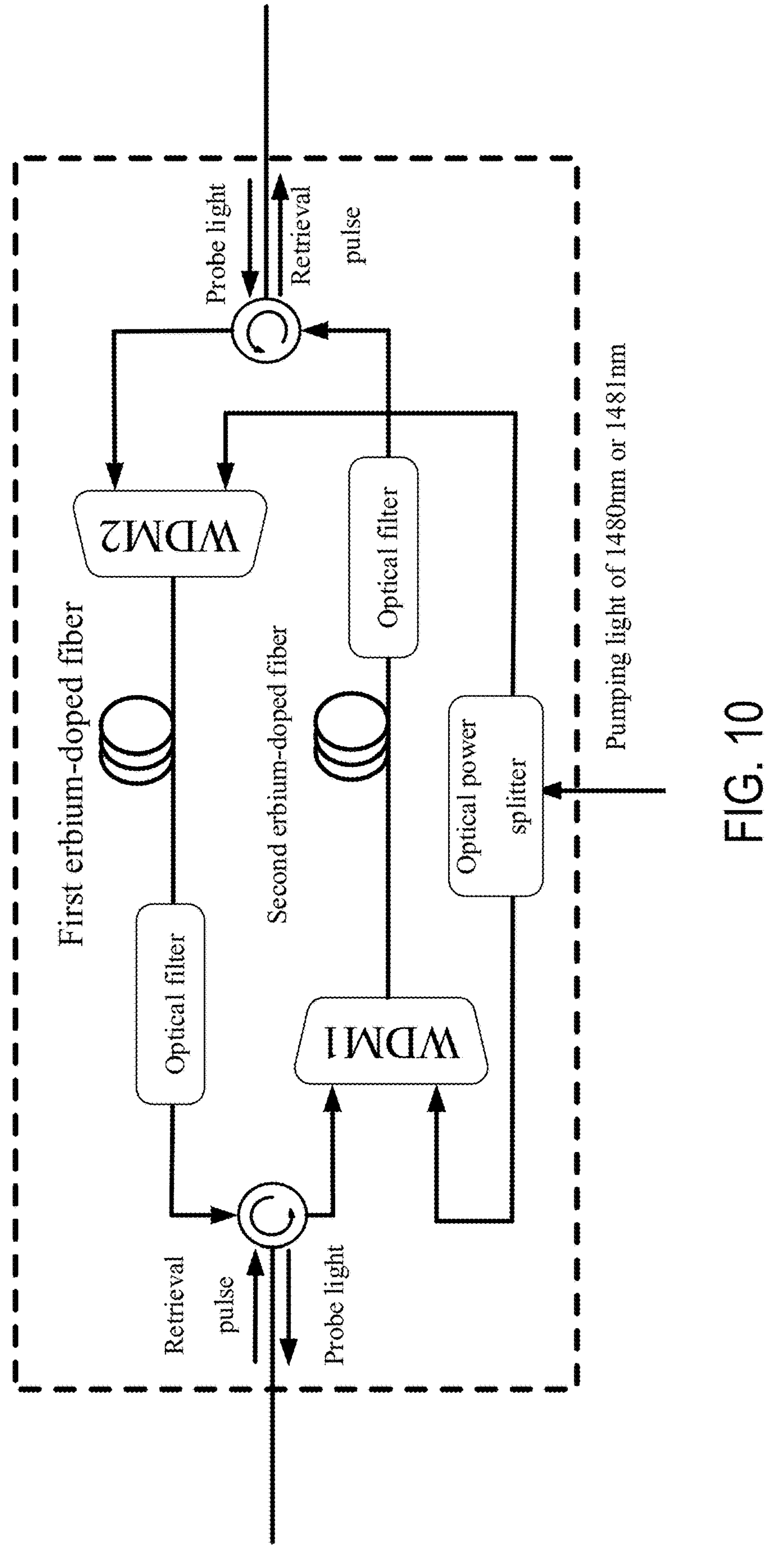
FIG. 10 illustrates a structural diagram of a single source gain unit.

FIG. 10 illustrates a structural diagram of the single wavelength passive gain module. The retrieval pulse is input from the sensing fiber at one terminal and enters the lower amplification branch through the first optical circulator. The probe light is input from the other end of the sensing fiber and enters the upper amplification branch through the second optical circulator. The pumping light around 1480 nm is input from the lower fiber and is decomposed into two parts through one optical power splitter, and the two parts enter the two amplification branches respectively. The structures of the upper and lower amplification branches are basically the same. Firstly, the pumping light around 1480 nm and the BOTDA retrieval pulse or the pumping light around 1480 nm and the probe light are combined through a wavelength division multiplexer, that is, the first wavelength division multiplexer WDM1 or the second wavelength division multiplexer WDM2, and subsequently output through one section of the erbium-doped fiber, a filter, and an optical circulator, and eventually output from another sensing fiber through an optical circulator.

Figure 11:
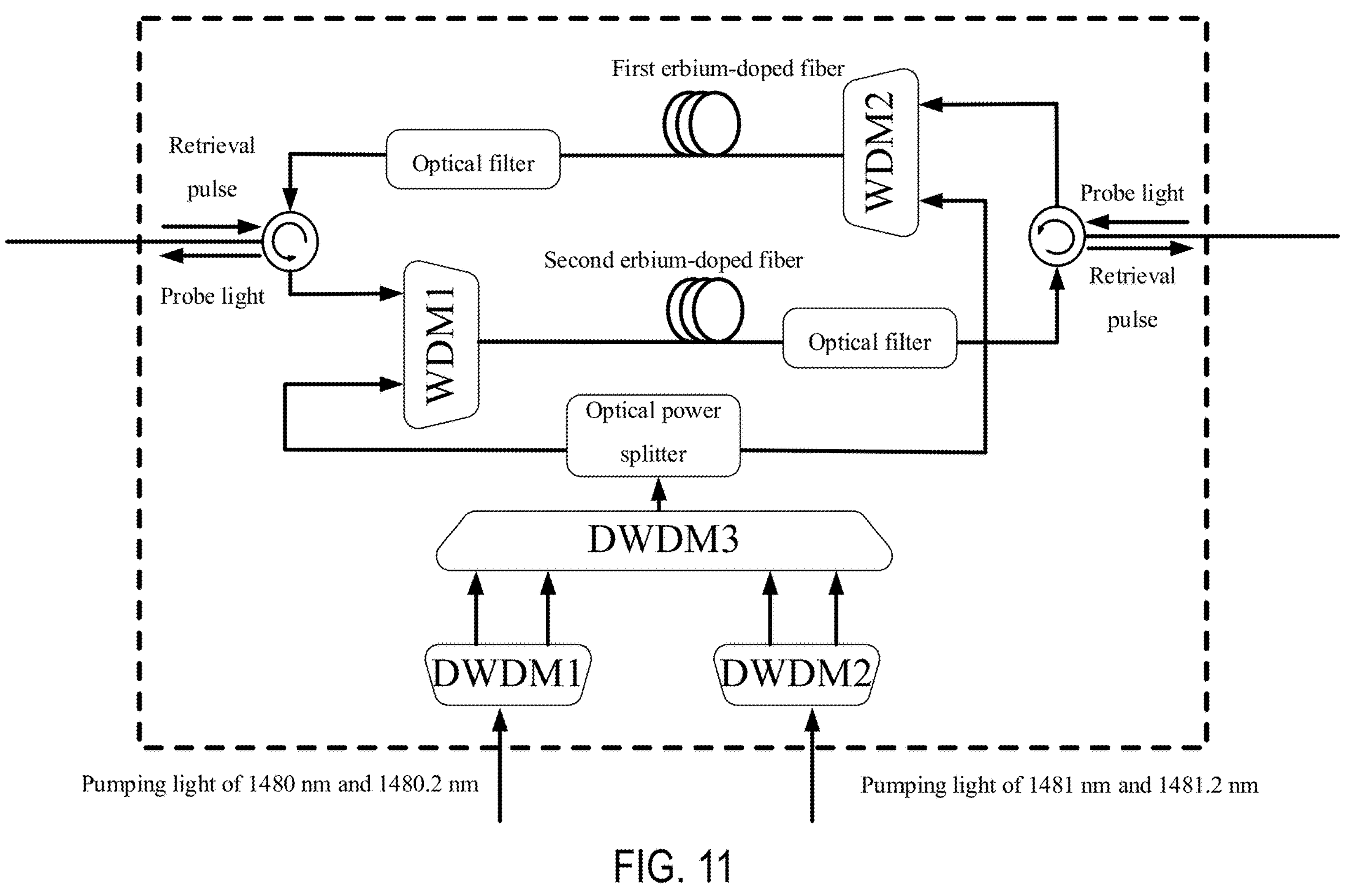
FIG. 11 illustrates a structural diagram of a dual source gain unit.

FIG. 11 illustrates the structural diagram of a dual wavelength passive gain module. Firstly, the pumping light of 1480 nm, 1480.2 nm, 1481.0 nm, and 1481.2 nm is decomposed through the first dense wavelength division multiplexer DWMD1 and the second dense wavelength division multiplexer DWDM2. Then, the decomposed light is combined through the third dense wavelength division multiplexer DWDM3 and is taken as the pumping light of the erbium-doped fiber. The remaining structures and steps are the same as those of the single wavelength passive gain module and will not be repeated herein.

The above are merely the preferred embodiments of the present disclosure. It should be noted that for an ordinary person skilled in the art, a plurality of improvements and embellishments can be made without departing from the principles of the present disclosure, and these improvements and embellishments should also be considered as the protection scope of the present disclosure.

What is claimed is:

1. A massive submarine monitoring Brillouin optical time domain analysis (BOTDA) system based on a mesh multi-stage remote pump amplification, comprising: a submarine monitoring optical cable, laid in a mesh structure interlaced with M-section transverse optical cables and N-section longitudinal optical cable, and a submarine monitoring BOTDA device;

wherein a transverse optical cable closest to the submarine monitoring BOTDA device is taken as a first section transverse optical cable, a longitudinal optical cable closest to the submarine monitoring BOTDA device is taken as a first section longitudinal optical cable, grid intersection points of the first section transverse optical cable and each section of the longitudinal optical cables except a (N+1)/2-th section longitudinal optical cable are connected with transverse branching optical cable interfaces, a grid intersection point of the first section transverse optical cable and the (N+1)/2-th section longitudinal optical cable are connected with a transverse single gain optical cable interface, grid intersection points of the first section longitudinal optical cable and each section of the transverse optical cables except a (M+1)/2-th section transverse optical cable are connected with longitudinal branching optical cable interfaces, a grid intersection point of the first section longitudinal optical cable and the (M+1)/2-th section transverse optical cable is connected with a longitudinal single gain optical cable interface, grid intersection points of the (M+1)/2-th section transverse optical cable and each section of the longitudinal optical cables except the first section longitudinal optical cable and the (N+1)/2-th section longitudinal optical cable are connected with longitudinal dual gain optical cable interfaces, grid intersection points of the (N+1)/2-th section longitudinal optical cable and each section of the transverse optical cables except the first section transverse optical cable and the (M+1)/2-th section transverse optical cable are connected with transverse dual gain optical cable interfaces, a grid intersection point of the (M+1)/2-th section transverse optical cable and the (N+1)/2-th section longitudinal optical cable is connected with a bidirectional single gain optical cable interface, M and N are both odd numbers greater than or equal to 3; and, the submarine monitoring BOTDA device is configured to transmit a group B of pumping light and a retrieval pulse to the first section transverse optical cable, and to transmit a group A of pumping light and a probe light to the first section longitudinal optical cable.

2. The massive submarine monitoring BOTDA system based on the mesh multi-stage remote pump amplification according to claim 1, wherein the submarine monitoring BOTDA device includes a BOTDA system terminal, a group A of remote optically pumping sources, and a group B of remote optically pumping sources, the group A of the remote optically pumping sources includes L pumping sources with wavelengths ranging from $\lambda_{A,1}$ to $\lambda_{A,L}$, and the group B of the remote optically pumping sources includes L pumping sources with wavelengths ranging from $\lambda_{B,1}$ to $\lambda_{B,L}$, a retrieval pulse is generated by the BOTDA system terminal and the group B of the pumping light enters an initial terminal of a monitoring optical cable, probe light is generated by the BOTDA system terminal and the group A of the pumping light enters a tail terminal of the monitoring optical cable, the initial terminal of the monitoring optical cable is the first section transverse optical cable and the tail terminal of the monitoring optical cable is the first section longitudinal optical cable; and the monitoring optical cable includes: a group A of pumping optical fibers configured to transmit the group A of the pumping light, a group B of pumping optical fibers configured to transmit the group B of the pumping light, and a sensing optical fiber configured to transmit the probe light and the retrieval pulse.

3. The massive submarine monitoring BOTDA system based on the mesh multi-stage remote pump amplification according to claim 2, wherein transverse sensing optical fibers at a left terminal and a right terminal of the transverse branching optical cable interface are directly connected with each other, and longitudinal sensing optical fibers at an upper terminal and a lower terminal of the transverse branching optical cable interface are directly connected with each other, and the transverse branching optical cable interface includes:

a first dense wavelength division multiplexer, configured to combine pumping light transmitted in the group B of the pumping optical fibers connected from a left terminal of the first dense wavelength division multiplexer and output the combined pumping light;

an optical power splitter, configured to split the pumping light output by the first dense wavelength division multiplexer into two paths, and transmit one path of the pumping light to a second dense wavelength division multiplexer and another path of the pumping light to a third dense wavelength division multiplexer;

the second dense wavelength division multiplexer, configured to decompose received pumping light and transmit decomposed pumping light to an optical fiber of an optical cable at a right terminal of a grid intersection where the transverse branching optical cable interface is located; and, the third dense wavelength division multiplexer, configured to decompose received pumping light and transmit decomposed pumping light to an optical fiber of an optical cable at an upper terminal of the grid intersection where the transverse branching optical cable interface is located.

4. The massive submarine monitoring BOTDA system based on the mesh multi-stage remote pump amplification according to claim 2, wherein longitudinal sensing optical fibers at an upper terminal and a lower terminal of the transverse single gain optical cable interface are directly connected with each other, and the transverse single gain optical cable interface includes:

a first dense wavelength division multiplexer, configured to combine pumping light transmitted in the group B of the pumping optical fibers connected from a left terminal of the first dense wavelength division multiplexer and output the combined pumping light;

an optical power splitter, configured to split the pumping light output by the first dense wavelength division multiplexer into three paths, and transmit a first path of the pumping light to a second dense wavelength division multiplexer, transmit a second path of the pumping light to a third dense wavelength division multiplexer, and transmit a third path of the pumping light to a single source gain module;

the second dense wavelength division multiplexer, configured to decompose received pumping light and transmit decomposed pumping light to an optical fiber of an optical cable at a right terminal of a grid intersection where the transverse single gain optical cable interface is located; and, the third dense wavelength division multiplexer, configured to decompose received pumping light and transmit decomposed pumping light to an optical fiber of an optical cable at an upper terminal of the grid intersection where the transverse single gain optical cable interface is located; and the single source gain module, configured to amplify a Brillouin retrieval pulse and the probe light transmitted transversely, wherein transverse sensing fibers at a left terminal and a right terminal of the single source gain module are connected with the single source gain module.

5. The massive submarine monitoring BOTDA system based on the mesh multi-stage remote pump amplification according to claim 2, wherein transverse sensing optical fibers at a left terminal and a right terminal of the longitudinal branching optical cable interface are directly connected with each other, and longitudinal sensing optical fibers at an upper terminal and a lower terminal of the longitudinal branching optical cable interface are directly connected with each other, and the longitudinal branching optical cable interface includes:

a first dense wavelength division multiplexer, configured to combine pumping light transmitted in the group A of the pumping optical fibers connected from a lower terminal of the first dense wavelength division multiplexer and output the combined pumping light;

an optical power splitter, configured to split the pumping light output by the first dense wavelength division multiplexer into two paths, and transmit one path of the pumping light to a second dense wavelength division multiplexer and another path of the pumping light to a third dense wavelength division multiplexer;

the second dense wavelength division multiplexer, configured to decompose received pumping light and transmit decomposed pumping light to an optical fiber of an optical cable at an upper terminal of a grid intersection where the longitudinal branching optical cable interface is located; and, the third dense wavelength division multiplexer, configured to decompose received pumping light and transmit decomposed pumping light to an optical fiber of an optical cable at a right terminal of the grid intersection where the longitudinal branching optical cable interface is located.

6. The massive submarine monitoring BOTDA system based on the mesh multi-stage remote pump amplification according to claim 2, wherein transverse sensing optical fibers at a left terminal and a right terminal of the longitudinal single gain optical cable interface are directly connected with each other, and the longitudinal single gain optical cable interface includes:

a first dense wavelength division multiplexer, configured to combine pumping light transmitted in the group A of the pumping optical fibers connected from a lower terminal of the first dense wavelength division multiplexer and output the combined pumping light;

an optical power splitter, configured to split the pumping light output by the first dense wavelength division multiplexer into three paths, and transmit a first path of the pumping light to a second dense wavelength division multiplexer, transmit a second path of the pumping light to a third dense wavelength division multiplexer, and transmit a third path of the pumping light to a single source gain module;

the second dense wavelength division multiplexer, configured to decompose received pumping light and transmit decomposed pumping light to an optical fiber of an optical cable at an upper terminal of a grid intersection where the longitudinal single gain optical cable interface is located; and, the third dense wavelength division multiplexer, configured to decompose received pumping light and transmit decomposed pumping light to an optical fiber of an optical cable at a right terminal of the grid intersection where the longitudinal single gain optical cable interface is located; and the single source gain module, configured to amplify a Brillouin retrieval pulse and the probe light transmitted longitudinally, wherein longitudinal sensing fibers at an upper terminal and a lower terminal of the single source gain module are connected with the single source gain module.

7. The massive submarine monitoring BOTDA system based on the mesh multi-stage remote pump amplification according to claim 2, wherein transverse sensing optical fibers at a left terminal and a right terminal of the longitudinal dual gain optical cable interface are directly connected with each other, and the longitudinal dual gain optical cable interface includes:

a first dense wavelength division multiplexer, configured to combine pumping light transmitted in the group A of the pumping optical fibers connected from a left terminal of the first dense wavelength division multiplexer and output the combined pumping light;

an optical power splitter, configured to split the pumping light output by the first dense wavelength division multiplexer into two paths, and transmit one path of the pumping light to a second dense wavelength division multiplexer and another path of the pumping light to a dual source gain module;

the second dense wavelength division multiplexer, configured to decompose received pumping light and transmit decomposed pumping light to an optical fiber of an optical cable at a right terminal of a grid intersection where the longitudinal dual gain optical cable interface is located; and, a third dense wavelength division multiplexer, configured to combine pumping light transmitted in the group B of the pumping optical fibers connected from a lower terminal of the third dense wavelength division multiplexer and output the combined pumping light to the dual source gain module; and the dual source gain module, configured to amplify the retrieval pulse and the probe light transmitted longitudinally, wherein longitudinal sensing fibers at an upper terminal and a lower terminal of the dual source gain module are connected with the dual source gain module.

8. The massive submarine monitoring BOTDA system based on the mesh multi-stage remote pump amplification according to claim 2, wherein longitudinal sensing optical fibers at an upper terminal and a lower terminal of the transverse dual gain optical cable interface are directly connected with each other, and the transverse dual gain optical cable interface includes:

a first dense wavelength division multiplexer, configured to combine pumping light transmitted in the group B of the pumping optical fibers connected from a lower terminal of the first dense wavelength division multiplexer and output the combined pumping light to a dual source gain module;

an optical power splitter, configured to split the pumping light output by the first dense wavelength division multiplexer into two paths, and transmit one path of the pumping light to a second dense wavelength division multiplexer and another path of the pumping light to the dual source gain module;

the second dense wavelength division multiplexer, configured to decompose received pumping light and transmit decomposed pumping light to an optical fiber of an optical cable at an upper terminal of a grid intersection where the transverse dual gain optical cable interface is located; and, a third dense wavelength division multiplexer, configured to combine pumping light transmitted in the group A of the pumping optical fibers connected from a left terminal of the third dense wavelength division multiplexer and output the combined pumping light to the dual source gain module; and the dual source gain module, configured to amplify the retrieval pulse and the probe light transmitted transversely, wherein transverse sensing fibers at a left terminal and a right terminal of the dual source gain module are connected with the dual source gain module.

9. The massive submarine monitoring BOTDA system based on the mesh multi-stage remote pump amplification according to claim 2, wherein the bidirectional single gain optical cable interface includes:

a first dense wavelength division multiplexer, configured to combine pumping light transmitted in the group A of the pumping optical fibers connected from a left terminal of the first dense wavelength division multiplexer and output the combined pumping light;

a first optical power splitter, configured to split the pumping light output by the first dense wavelength division multiplexer into two paths, and transmit one path of the pumping light to a second dense wavelength division multiplexer and another path of the pumping light to a first single source gain module;

the second dense wavelength division multiplexer, configured to decompose received pumping light and transmit decomposed pumping light to an optical fiber of an optical cable at a right terminal of a grid intersection where the bidirectional single gain optical cable interface is located;

the first single source gain module, configured to amplify the retrieval pulse and the probe light transmitted transversely, wherein transverse sensing fibers at a left terminal and a right terminal of the first single source gain module are connected with the first single source gain module;

a third dense wavelength division multiplexer, configured to combine pumping light transmitted in the group B of the pumping optical fibers connected from a lower terminal of the third dense wavelength division multiplexer and output the combined pumping light;

a second optical power splitter, configured to split the pumping light output by the third dense wavelength division multiplexer into two paths, and transmit one path of the pumping light to a fourth dense wavelength division multiplexer and another path of the pumping light to a second single source gain module; and the second single source gain module, configured to amplify the retrieval pulse and the probe light transmitted longitudinally, wherein transverse sensing fibers at an upper terminal and a lower terminal of the second single source gain module are connected with the second single source gain module.

10. The massive submarine monitoring BOTDA system based on the mesh multi-stage remote pump amplification according to claim 7, wherein the dual source gain module includes:

a first dense wavelength division multiplexer, configured to decompose the group A of the pumping light into pumping light of corresponding wavelengths, a second dense wavelength division multiplexer, configured to decompose the group B of the pumping light into pumping light of corresponding wavelengths, a third dense wavelength division multiplexer, configured to combine all the pumping light decomposed by the first dense wavelength division multiplexer and the second dense wavelength division multiplexer, and take the combined light as remote pumping light in a single source gain module, and the single source gain module, configured to amplify the probe light and retrieval pulse under an excitation of remote pumping light generated by the third dense wavelength division multiplexer; wherein the single source gain module includes:

an optical power splitter, configured to split the received remote pumping light into two paths, and transmit one path of the remote pumping light to an upper amplification branch and another path of the remote pumping light to a lower amplification branch, a first optical circulator, configured to transmit the retrieval pulse input from a sensing fiber located at one terminal of the first optical circulator to the lower amplification branch, and transmit probe light received from the upper amplification branch to the sensing fiber at another terminal of the first optical circulator;

the lower amplification branch, composed of a wavelength division multiplexer, an erbium-doped fiber, and a filter, configured to combine the remote pumping light and the retrieval pulse or combine the remote pumping light and the probe light, and transmit the combined light to a second optical circulator;

the second optical circulator, configured to transmit the probe light input from a sensing fiber located at one terminal of the second optical circulator to the lower amplification branch, and transmit a retrieval pulse received from the lower amplification branch to the sensing fiber at another terminal of the second optical circulator; and the upper amplification branch, composed of a wavelength division multiplexer, an erbium-doped fiber, and a filter, configured to combine the remote pumping light and the retrieval pulse or combine the remote pumping light and the probe light, and transmit the combined light to the first optical circulator.

11. The massive submarine monitoring BOTDA system based on the mesh multi-stage remote pump amplification according to claim 8, wherein the dual source gain module includes:

a first dense wavelength division multiplexer, configured to decompose the group A of the pumping light into pumping light of corresponding wavelengths, a second dense wavelength division multiplexer, configured to decompose the group B of the pumping light into pumping light of corresponding wavelengths, a third dense wavelength division multiplexer, configured to combine all the pumping light decomposed by the first dense wavelength division multiplexer and the second dense wavelength division multiplexer, and take the combined light as remote pumping light in a single source gain module, and the single source gain module, configured to amplify the probe light and retrieval pulse under an excitation of remote pumping light generated by the third dense wavelength division multiplexer; wherein the single source gain module includes:

an optical power splitter, configured to split the received remote pumping light into two paths, and transmit one path of the remote pumping light to an upper amplification branch and another path of the remote pumping light to a lower amplification branch, a first optical circulator, configured to transmit the retrieval pulse input from a sensing fiber located at one terminal of the first optical circulator to the lower amplification branch, and transmit probe light received from the upper amplification branch to the sensing fiber at another terminal of the first optical circulator;

the lower amplification branch, composed of a wavelength division multiplexer, an erbium-doped fiber, and a filter, configured to combine the remote pumping light and the retrieval pulse or combine the remote pumping light and the probe light, and transmit the combined light to a second optical circulator;

the second optical circulator, configured to transmit the probe light input from a sensing fiber located at one terminal of the second optical circulator to the lower amplification branch, and transmit a retrieval pulse received from the lower amplification branch to the sensing fiber at another terminal of the second optical circulator; and the upper amplification branch, composed of a wavelength division multiplexer, an erbium-doped fiber, and a filter, configured to combine the remote pumping light and the retrieval pulse or combine the remote pumping light and the probe light, and transmit the combined light to the first optical circulator.

* * * * *